(12) United States Patent
Enomoto et al.

(10) Patent No.: US 6,441,881 B1
(45) Date of Patent: Aug. 27, 2002

(54) ELECTROPHORETIC LIQUID CRYSTAL REFLECTIVE DISPLAY WITH SLANTED PARTITION WALLS

(75) Inventors: Shintaro Enomoto; Hideyuki Nakao; Hajime Yamaguchi; Yutaka Nakai, all of Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 09/942,590

(22) Filed: Aug. 31, 2001

(30) Foreign Application Priority Data

Sep. 14, 2000 (JP) .......................... 2000-279478

(51) Int. Cl.[7] ............................................ G02F 1/1339
(52) U.S. Cl. .................. 349/156; 349/166; 349/84; 349/86; 349/66; 345/107; 359/296
(58) Field of Search ............................ 349/156, 66, 86, 349/84, 91, 89; 359/296; 345/107

(56) References Cited

U.S. PATENT DOCUMENTS

| | | | | |
|---|---|---|---|---|
| 4,305,807 A | * | 12/1981 | Somlody | 349/106 |
| 6,130,774 A | * | 10/2000 | Albert et al. | 359/26 |

* cited by examiner

*Primary Examiner*—Kenneth Parker
*Assistant Examiner*—V. Litovchenk
(74) *Attorney, Agent, or Firm*—Oblon, Spivak, McClelland, Maier & Neustadt, P.C.

(57) ABSTRACT

A reflective display having a first substrate having a first electrode, a second substrate having a second electrode and arranged opposite to the first electrode, and partition walls existing between the first and second substrates and arranged in a direction not perpendicular to the first and second substrates. A non-conductive liquid in which colored particles are dispersed resides in a cell including the partition walls. The colored particles can moved by an electric field, and the display color is thereby changed. Alternatively, the display color can be changed by shape deformation of a liquid-crystal-filled microcapsule enclosed in the cell.

33 Claims, 9 Drawing Sheets

ELECTROPHORETIC LIQUID CRYSTAL REFLECTIVE DISPLAY WITH SLANTED PARTITION WALLS

CROSS-REFERENCE TO RELATED APPLICATIONS

This application is based upon and claims the benefit of priority from Japanese Patent Application No. P2000-279478, filed on Sep. 14, 2000, the entire contents of which are incorporated herein by reference.

BACKGROUND OF THE INVENTION

1. Field of the Invention

The present invention relates to a display element utilizing a phenomenon in which particles filled in a cell are moved when a voltage is applied onto the cell.

2. Discussion of the Background

Various types display elements have been studied as display elements for information equipments and other purpose of use. For example, there are display elements using liquid crystals or display elements using electrophoresis.

In a liquid crystal display element, the liquid crystal is filled in a cell. When a voltage is applied onto this cell, the orientation of the liquid crystal molecule is changed, and by this change, the light transmissivity of the whole cell is changed. By the change of the light transmissivity, white and back are expressed, and the information is displayed.

In the condition that the electric field is not applied, for a liquid crystal display apparatus through which the light is normally transmitted, the liquid crystal display changes in such a manner that the light is not transmitted through. Further, in the condition that the electric field is not applied, for a liquid crystal display apparatus through which the light normally is not transmitted when the electric field is applied, the liquid crystal display is changed in such a manner that the light is transmitted through. Further, the intensity of the light can be changed corresponding to the intensity of the electric field.

The liquid crystal display element has the advantage that it is smaller in electric consumption than a cathode ray tube (CRT) display, and a thin type display panel can be realized. Accordingly, the liquid crystal display element has been widely used for a personal computer, word processor, and other information equipments for the office.

However, liquid crystal display elements require fine processing, production is difficult, and the cost is high. Further, because transmitted light is used, a bright display apparatus is hardly produced. Further, because polarized light is used, commonly the easily viewed direction is limited.

On the other hand, a display element operated by electrophoresis has an advantage that, because the light to be observed is a reflected light, it is bright, and an angle of visibility is easily increased.

A display element using the electrophoresis is generally structured in such a manner that the non-conductive liquid, in which the electrophoresis particles are dispersed, is sandwiched by a pair of transparent electrodes. Electrophoresis particles formed of white non-conductive liquid or colored titanium oxide are often used. The electrophoresis particles are charged positively or negatively.

When an electric field is applied onto the liquid layer, the charged electrophoresis particles are moved corresponding to the electric field. When the electrophoresis particles are collected to the transparent electrode on the observer side, the electrophoresis particles cover the transparent electrode on the observer side. Conversely, when the electrophoresis particles are separated from the transparent electrode on the observer side, the non-conductive liquid comes into contact with the transparent electrode. For example, when electrophoresis particles are black, and the non-conductive liquid is white, and when electrophoresis particles cover the transparent electrode on the observer side, the black is displayed. When the electrophoresis particles are separated from the transparent electrode on the observer side, white is displayed.

A conventional electrophoresis display element has, for example, the structure as shown in FIG. 1.

In the electrophoresis display element, a non-conductive liquid 6 is filled between the substrate 1 and the substrate 2. These substrate 1 and substrate 2 have respectively an electrode 3 and an electrode 4. The substrate and electrode which display an image, are transparent, and a non-conductive liquid 6 can be observed from the outside. Further, charged colored particles 7 are dispersed in the non-conductive liquid 6.

When the voltage is applied between the electrode 3 and the electrode 4, the charged colored particles 7 dispersed in the non-conductive liquid 6 are moved along the direction of the electric field.

For example, a case where the colored particles 7 are negative charged black particles, and the non-conductive liquid 6 is white, will be considered herein.

When a positive potential is applied onto the electrode 4, and a negative potential is applied onto the electrode 3, black particles 7 are moved to substrate 2 by the electrophoresis. At this time, "black" appears on the substrate 2 (as shown in FIG. 1A). Further, when an inverse potential difference is applied between electrodes, the black particles 7 are moved to substrate 1. In this case, "white" (i.e., the color of the non-conductive liquid 6) appears on the substrate 2 (as shown in FIG. 1B). In this manner, a change of different colors can be displayed on the observed surface.

In such an electrophoresis display element, there are problems, and the electrophoresis display has not yet come into practical use.

For practical use, it is necessary to realize low voltage drive and high speed response.

To realize a low voltage drive, the distance between electrodes can be reduced and the intensity of the electric field can be increased. Further, for a high speed response, the distance between substrates and the movement distance needs to be reduced. That is, for both low voltage drive and high speed response, the distance between substrates needs to be reduced.

However, when the distance between substrates is reduced, there is a problem that the thickness of the non-conductive liquid is reduced, and light penetrates through the non-conductive liquid. Accordingly, when the white display is regarded as important, it is necessary that the degree of turbidity of the white non-conductive liquid is increased. However, when black particles are collected on the display surface side, there is a tendency for the white of the non-conductive liquid to remain on the display surface side, making the display surface gray. That is, when a good white display is conducted, the black display becomes insufficient.

Reversely, when the degree of turbidity of the white liquid is decreased, a good black display can be conducted, but there is a tendency for the white display to become insufficient.

As described above, in the conventional electrophoresis element, the structure appropriate for the low voltage drive and the high speed response can not maintain the display quality. Further, a reduction in the thickness of a display element is difficult in a conventional electrophoresis element.

SUMMARY OF THE INVENTION

Accordingly, one object of the present invention is to provide a noval display which ameliorates the problems of the conventional display.

The above object, and other objects, are achieved accordingly to the present invention by providing a noval reflective display including a transparent first substrate, a transparent first electrode formed on the first substrate, a second substrate located opposite to the first substrate, a second electrode formed on the second substrate, partition walls dividing the display into cells, each cell surrounded by the partition walls, the first substrate, and the second substrate and provided with an electrical bias from the first electrode and the second electrode, the partition walls slanted with respect to the first substrate and the second substrate, and at least one colored particle located in at least one cell and configured to move within the at least one cell such that a side of a part of the partition wall is observed through the first substrate under a first bias condition and the side is obscured by the at least one colored particle under a second bias condition.

A pixel may include a plurality of the cells.

The partition walls may have a white color.

The second substrate and the second electrode may be transparent.

The first electrode is a common electrode and the second electrode may be a pixel electrode.

The first electrode and the second electrode may have stripe shape, and the first electrode and the second electrode may be oriented perpendicular to each other.

A plurality of the colored particles may be dispersed in a non-conductive liquid residing in the cell, and the colored particles may be charged.

The non-conductive liquid may have a color different from a color of the colored particle.

The non-conductive liquid may have a similar color as a color of the partition wall.

A plurality of the colored particles may be dispersed in a liquid crystal residing in the cell.

The colored particles in one of the cells may have a color different from a color of the colored particles in the other cells.

The colored particles may have a red color enclosed in a first group of the cells, the colored particles may have a green color enclosed in a second group of the cells and the colored particles may have a blue color enclosed in a third group of the cells.

The colored particles may have a black color enclosed in a fourth group of the cells.

One of the partition walls may have a color different from a color of the other partition walls.

The colored particle may be a polymer capsule encapsulating a liquid crystal medium, and the polymer capsule may be transformed, with an electric field, from a spherical shape into an elongated shape.

The polymer capsule may have a color different from a color of the partition wall.

The liquid crystal may have a color different from a color of the partition wall.

The cell encloses the colored particle and a non-conductive liquid.

The non-conductive liquid may be a liquid crystal.

The colored particle may be a polymer capsule encapsulating a non-conductive liquid, and the cell can enclose the colored particle and a liquid crystal.

A method for manufacturing a display includes forming partition walls on a first substrate, contacting a second substrate on the partition walls, shifting the first substrate and the second substrate, sealing the first substrate and the second substrate, and injecting colored particles and non-conductive liquid between the partition walls and the first substrate and the second substrate.

BRIEF DESCRIPTION OF THE DRAWINGS

A more complete appreciation of the invention and many of the attendant advantages thereof will be readily obtained as the same become better understood by references to the following detailed description when considered in connection with the accompanying drawings, wherein.

DETAILED DESCRIPTION OF THE EMBODIMENT

Figure 1:
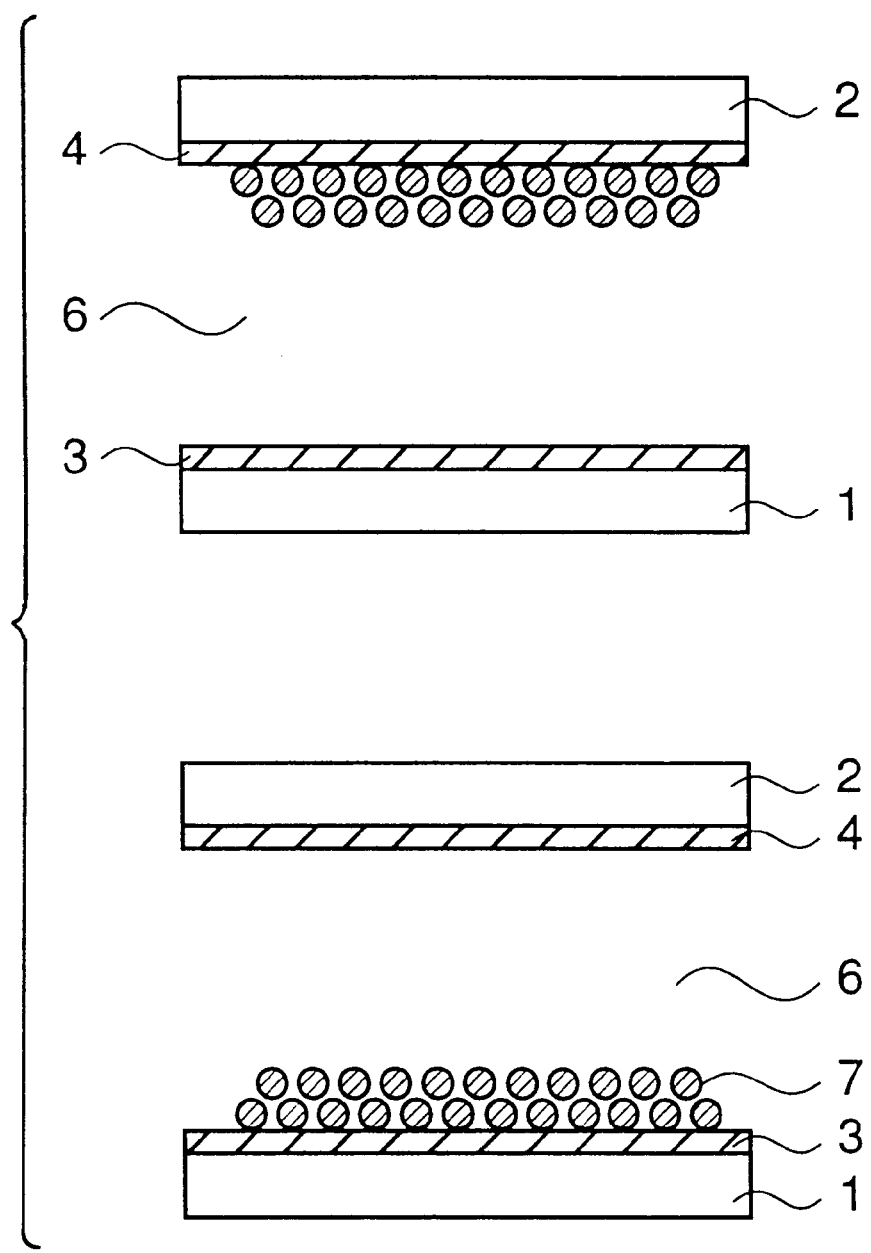
FIG. 1 is a view of a conventional electrophoresis display apparatus.
Figure 2:
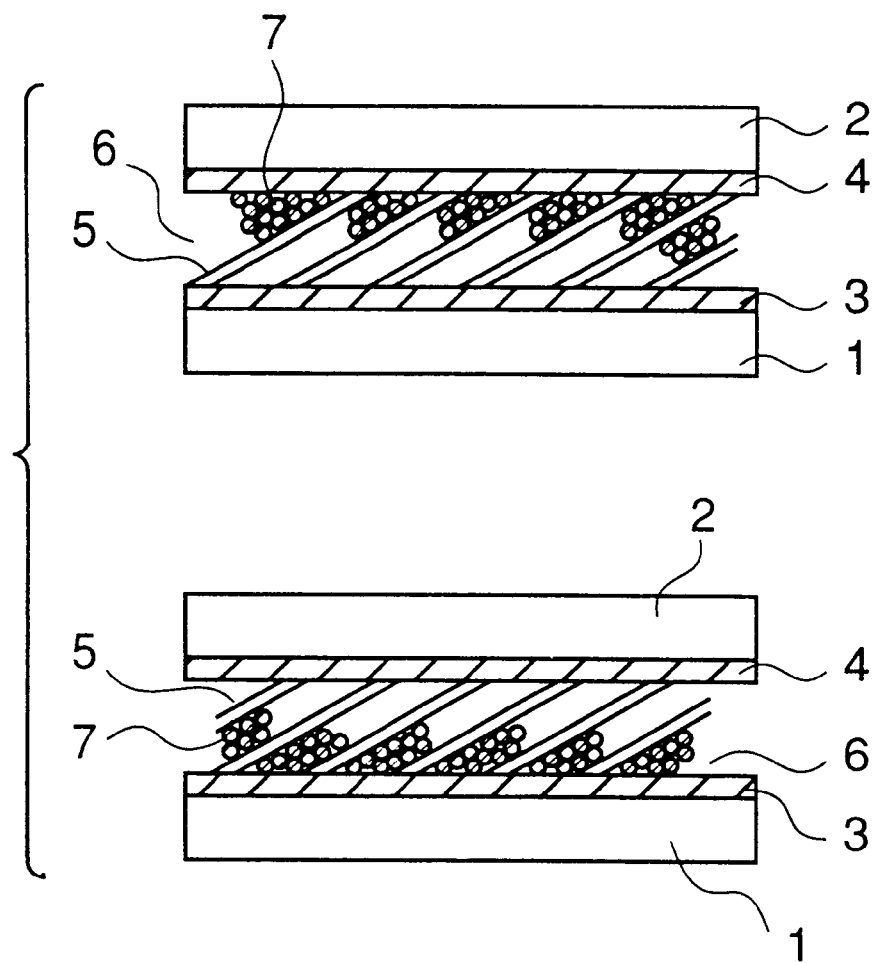
FIG. 2 is a view for explaining the first example of the present invention.

Referring now to the drawings, wherein like reference numerals designate identical or corresponding parts throughout the several views, and more particularly to FIG. 2 thereof, the first example according to the present invention will be described below.

The display element of the present example has a substrate 1, a substrate 2, and a partition wall 5 sandwiched between these substrates. On the surfaces of substrate 1 and substrate 2, a pixel electrode 3 and a pixel electrode 4 are respectively provided. A substrate on the side displaying the image and a pixel electrode on that side are transparent, and the substrate on the display side is structured in such a manner that an interior between the substrates can be observed from the outside. Both substrates 1 and 2 and the pixel electrode may be transparent. Hereinafter, it is defined that the present display element is observed from the upper side, and the substrate 2 and the pixel electrode 4 are transparent, and the explanation will be carried out below.

It is preferable that the distance between electrodes is made thinner than an ordinary electrophoresis display element, and generally, about 10 μm to 50 μm. Preferably, the distances between electrodes will be about 10 μm to 20

μm. When the thickness is reduced in this manner, a low voltage drive can be carried out.

The partition wall 5 is provided in such a manner that the partition wall is slanted to the substrate 1 and the substrate 2. Further, the partition wall 5 is light shielding and colored. As shown in FIG. 2, the slanting space is formed of the pixel electrode 3, pixel electrode 4 and the partition wall 5. Hereinafter, this space is called a cell.

The thickness of the partition wall 5 is not specifically limited, but, from the view point of the display quality, the thickness is preferably about 1 μm to 30 μm, and more preferably, about 1 μm to 10 μm. Further, the angle formed between the partition wall 5 and the substrate 2 is arbitrary, unless it is a right angle. In the present example, it is preferable that angle is about 10° C. to 80° C., and more preferably about 20° C. to 60° C.

As a polymer constituting the partition wall 5, the following thermoplastic resins can be used: polyethylene class; chlorinated polyethylene class; ethylene copolymer of ethylene vinyl acetate copolymer, ethylene acrylic acid maleic anhydride polymer; polybutadien class; polyester class of polyethylene terephthalate, polybutylene terephthalate, and polyethylene naphthalate; polypropylene class; polyisobutylene class; polyvinyl chloride class; polyvinylidene chloride class; polyvinyl acetate class; polyvinyl alcohol class; polyvinyl acetal class; polyvinyl butyral class; tetra fluoride ethylene resin class; tri fluoride ethylene chloride resin class; ethylene fluoride propylene resin class; vinylidene fluoride resin class; vinyl fluoride resin class; ethylene tetra fluoride copolymer of tetra fluoride ethylene perfluoro-alkoxi-ethylene copolymer, tetra fluoride ethylene perfluoro-alkyl vinyl ether copolymer, tetra fluoride ethylene propylene hexafluoride copolymer, and ethylene tetra fluoride ethylene copolymer; fluorine resin class of polybenzo-oxazole including fluorine; acrylic resin class; methacrylic resin class of poly methyl methacrylate; poly acrylo nitrile class; acrylo nitrile copolymer of acrylo nitrile butadiene styrene copolymer; polystyrene class; polystyrene halide class; styrene copolymer of styrene methacrylate copolymer, and styrene acrylo nitrile copolymer; ionic polymer of polystyrene sulfonic sodium, and polyacrylic sodium; acetal resin class; polyamide class of nylon 66; gelatin; gum arabic; poly carbonate class; polyester carbonate class; cellulose resin class; phenol resin class; urea resin class; epoxy resin class; unsaturated polyester resin class; alkyd resin class; melamine resin class; poly urethane class; diaryl phthalate resin class; polyphenylene oxide class; polyphenylene sulfide class; polysulfone class; polyphenyl sulfone class; silicone resin class; polyimide class; bismuth imide triazine resin class; polyimide amide class; polyether sulfone class; poly methyl pentene class; polyether ether ketone class; polyether imide class; polyvinyl carbazole class; norbornene amorphous polyolefine class.

End portions of the substrate 1 and the substrate 2 are sealed by side plates (not shown). These side plates may also function as spacers to maintain a constant distance between the substrate 1 and the substrate 2.

A non-conductive liquid 6 fills the slanting space. Herein, the non-conductive liquid 6 may be colored or transparent. Further, the non-conductive liquid 6 may be the same color as the partition wall 5 or a different color from the partition wall. As the non-conductive liquid, silicone oil, toluene, xylene, high purity oil, and the other transparent liquids, or white liquids mixed with the scattered particles in it, or colored liquids colored by dyes, may be used.

Colored particles 7 are dispersed in the non-conductive liquid 6. The colored particles 7 are colored by a color different from the non-conductive liquid 6. However, the colored particles 7 may be the same color as the partition wall 5 or may be a different color from the partition wall. Further, the colored particles 7 are charged to a positive or a negative. For example, particles in which pigment or dye (for example, carbon or the other) is mixed in polystyrene, polyethylene, and the other resin, may be used. The diameter of a fine particle of the colored particles is the diameter of the fine particle when measured by the measuring method utilizing the light scattering, and generally a particle of about 0.1 μm to 10 μm, may be used.

The display element of the present example, relating to portions other than the partition wall, may be structured by the same material as the conventionally known electrophoresis display element.

Figure 3:
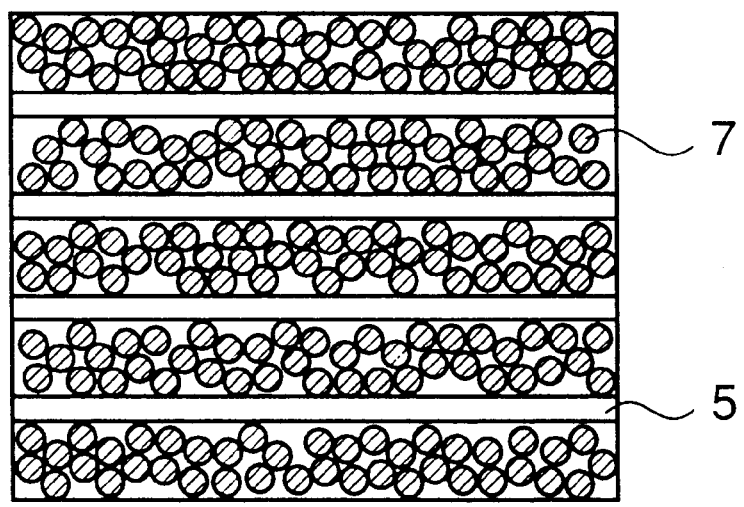
FIG. 3 is a plan view of FIG. 2.

FIG. 3 is a plan view of FIG. 2A. When viewed from the upper direction, an upper end portion of the partition wall 5 is extended stripe-like, and the upper end portion can be observed as if the colored particles 7 cover the partition walls. That is, the color of the colored particles 7 appears, and the partition wall 5 and non-conductive liquid 6 are hidden.

When the potential difference is applied across the electrode 3 and the electrode 4, the charged colored particles are moved by the electrophoresis. For example, in the case where the colored particles are charged with a negative and a positive potential is applied onto the electrode 4, the colored particles 7 are moved to the electrode 4 by the resultant electrophoresis. At this time, the colored particle 7 is moved along the slanting partition wall 5. As the result, the colored particles 7 cover the surface of the electrode 4.

Reversely, when the negative potential is applied onto the electrode 4, as shown in FIG. 2B, the colored particles 7 are moved to the electrode 3.

As shown in FIG. 2A, when the colored particles 7 are attracted to the electrode 4, the color of the colored particles 7 can be observed when viewed from the substrate 2 side.

Further, conversely, as shown in FIG. 2B, when the colored particles 7 are attracted to the electrode 3, the colored particles 7 are hidden by the partition wall 5 when viewed from the substrate 2 side. Accordingly, in this case, the color of the nonconductive liquid 6 can be observed from the substrate 2 side.

Figure 4:
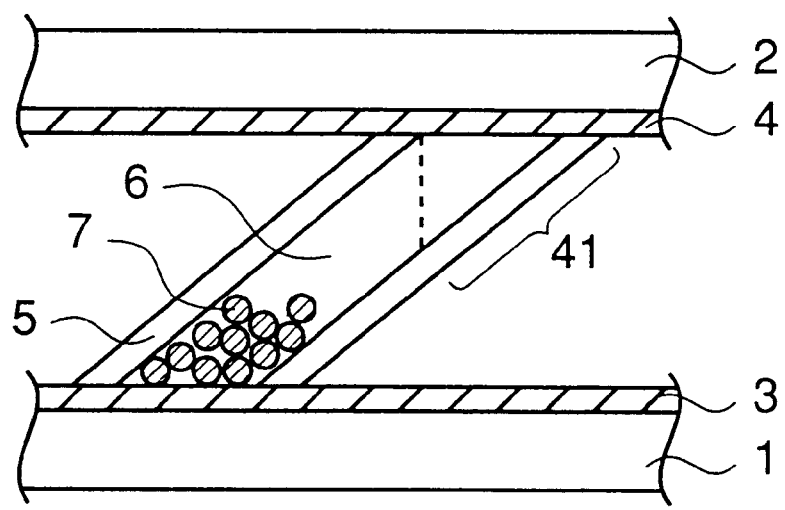
FIG. 4 is a partial enlargement view of FIG. 2.

FIG. 4 is a partial enlarged view of FIG. 2B. An area which can be observed from the substrate 2 side, is an area 41. Herein, it is defined that the display apparatus is observed from the arrowed direction. When the non-conductive liquid 6 is transparent, the color of the partition wall 5 can be observed. When the color of the non-conductive liquid 6 is thin, the color of the display apparatus becomes a color mixture of the nonconductive liquid 6 and the partition wall 5. That is, the colored particles 7 are hidden by the partition wall 5 provided slantingly.

However, at least one of the paired substrates should be generally transparent so that the color display by the fine particles in the cell can be observed. In this connection, in order to conduct special display, the substrate can be colored or the marking can be made on the substrate. Further, only one portion of the partition wall can be colored, or the non-conductive liquid whose color of only one portion is different, can be used. In the same manner also for electrodes, although at least one of the electrodes should be transparent, it may be colored or the marking may be made on it.

In the present example, in order to display the change of color, it is necessary that the colored particles 7 are colored with a different color from both of the non-conductive liquid 6 and partition wall 5. When all of the colored particles 7, non-conductive liquid 6, and the partition wall 5 are the same color, no change of color occurs by movement of the particles.

When these conditions are satisfied, respective colors are not specifically limited. It is preferable that the color of the non-conductive liquid 6 is the same as the partition wall 5, or transparent. More preferably, the partition wall 5 is white, and the non-conductive liquid 6 is white or transparent. In such the manner, 2-color display of white and the color of the colored particles 7 can be carried out, and the finest display quality can be obtained. Further, when the color of the partition wall 5 is white, the coloring of the colored particles can also become fine, and a higher contrast display can be carried out.

Figure 5:
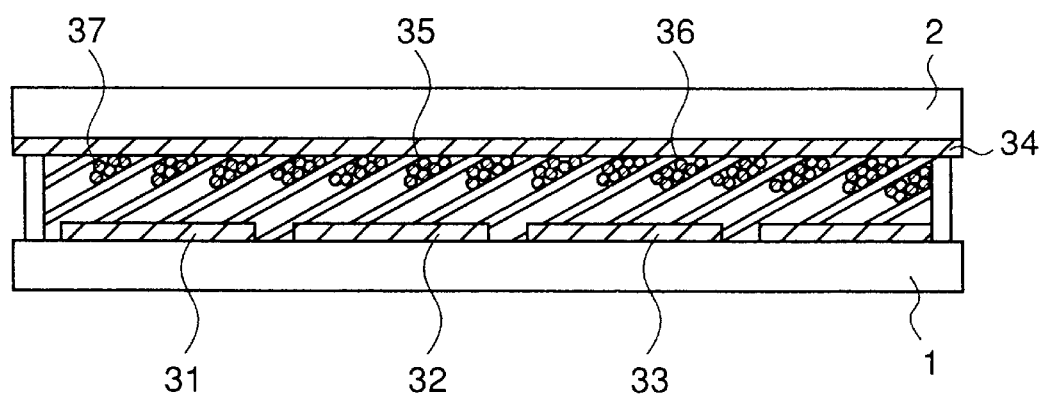
FIG. 5 is a view for explaining an example of a case where a plurality of colored particles are used.

As described above, by the structure of the present example, a 2-color display can be carried out. On the basis of this 2-color display, when, further, a plurality of pixels using different colored particles are combined, the display element of the color display can be formed. That is, colored particles of different colors are filled for each cell, and when respective cells are individually controlled, a color display by the plane color mixture is carried out. These conditions are typically shown in FIG. 5.

Herein, colored particles 34, colored particles 35 and colored particles 36 are respectively colored with different colors from each other. For example, these colors are red, green, blue or yellow, magenta, and cyan of three primary colors. Further, black can be combined with these as needed. At this time, it is preferable that the color of the partition wall is white, and the color of the non-conductive liquid is transparent or white.

An electrode 31, electrode 32, and electrode 33 which independently control the cells including respective colored particles, are arranged on the substrate 1. Further, a common electrode 34 is arranged on the substrate 2. Herein, an example in which the common electrode 34 is formed over the whole surface, is shown, but, it may be separated for each of cells. Other than this, stripe-like electrodes can be respectively provided on the substrate 1 and the substrate 2, and these stripe-like electrodes can also be arranged in such a manner that these electrodes are perpendicular to each other. In this case, in the cell, the electrodes are arranged in such a manner that the electrode on the substrate 1 crosses the electrode on the substrate 2.

When the cell is arranged two-dimensionally, a display element by which a point display, like that commonly used in liquid crystal displays is possible, and can be obtained.

According to the structure of the present example, a thickness reduction of the display element, an improvement of display quality, low voltage drive, and high speed response can be attained.

Because the colored particles move between a position in which the colored particles can not be observed, being interrupted by the partition wall, and a position in which the colored particles can be observed, without being interrupted by the partition wall, a high contrast color display can be carried out depending on a condition that the colored particle can be observed or can not be observed. That is, the contrast can be increased without depending on the color or turbidity of the non-conductive liquid. Accordingly, the reduction of the distance of the electrode by which the colored particle is moved, that is, the reduction of the thickness of the display apparatus, can be attained. By the thickness reduction of the display apparatus, control by the low voltage can be attained. Further, by the thickness reduction of the display apparatus, the movement distance of the colored particles is reduced, and a high speed response can be attained.

Next, the second example will be described.

The present example will be described about a display element in which the colored particle dispersed in the liquid crystal is moved by the voltage change.

When the voltage is applied onto the liquid crystal, specifically onto the smectic liquid crystal, it is reported that a directional movement is generated in the fine particles dispersed in the liquid crystal phase (Z. Zou et al, Phys. Rev. Lett., 75, 1799 (1995), T. Togo et al, Jpn. J. Appl. Phys., 36, L1520 (1997)).

Figure 6:
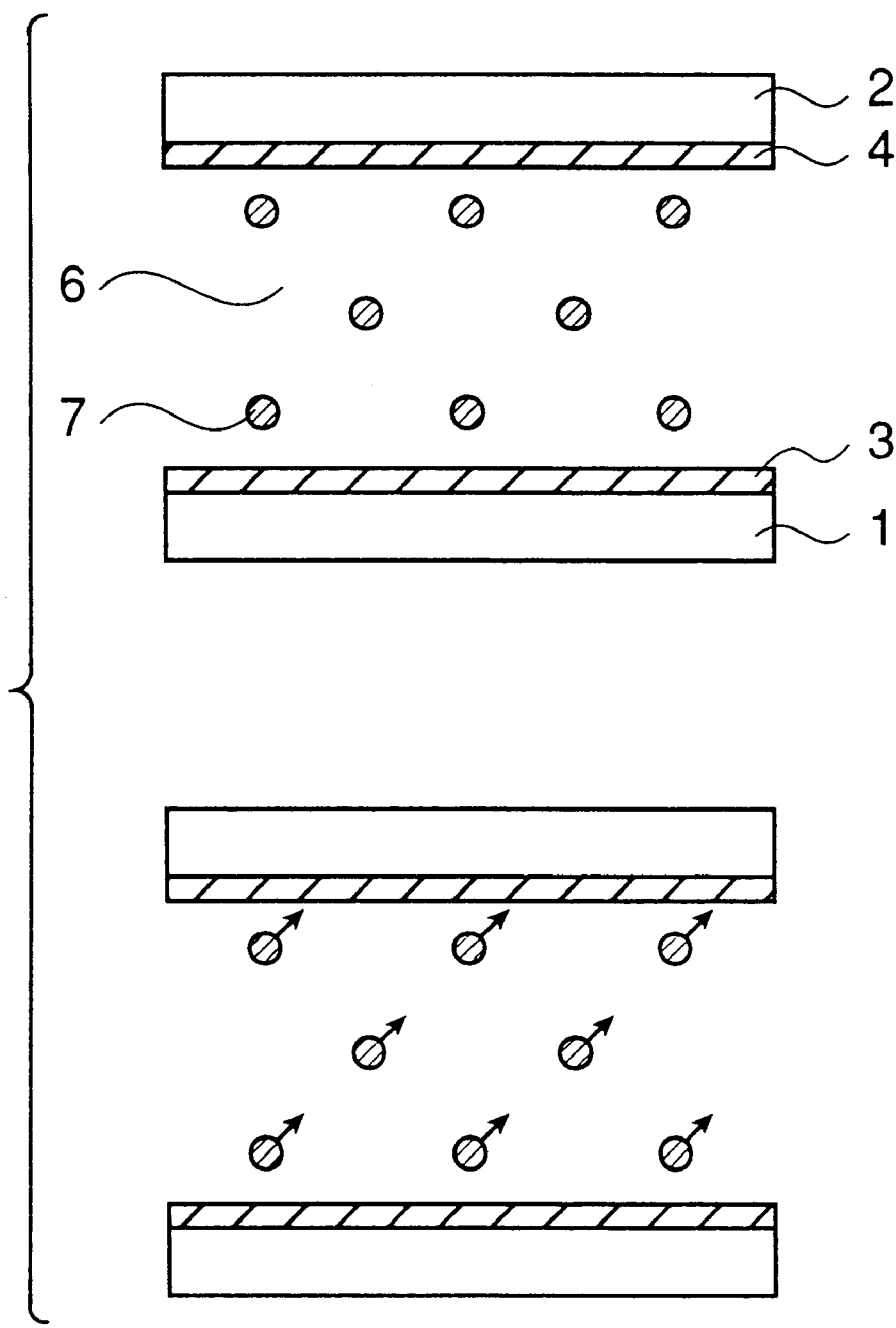
FIG. 6 is a view for explaining the second example of the present invention.

By using FIG. 6, this status will be described.

In FIG. 6A, a liquid crystal 6 and a fine particle 7 dispersed in the liquid crystal are filled between the electrode 3 and the electrode 4.

Herein, when the voltage is applied across the electrode 3 and the electrode 4, the orientation of the liquid crystal is changed. In this case, a flow in a predetermined direction is generated in the liquid crystal 6, and the fine particle 7 is moved to the direction different from the electric field direction (FIG. 6B).

Such movement of the fine particle 7 is generated by the mechanism quite different from the electrophoresis, and it is unnecessary that the particles are charged.

Accordingly, in the present example, a liquid crystal is used instead of the nonconductive liquid in the first example.

As the liquid crystal, the P type or N type nematic liquid crystal, or ferroelectric liquid crystal can be used.

As the colored particle, a resin which can be used for the partition wall, can be utilized. For coloring, a pigment or dye, to which, for example, carbon is added, can be used. Herein, it is unnecessary that the colored particle be charged.

In the display element in the present example, because the colored particle is moved by the orientation of the liquid crystal, the movement direction does not always coincide with the direction of the electric field. Accordingly, it is preferable, to control the movement direction of the colored particle, that the surface of the electrode is processed. The method of the processing of the electrode surface is not specifically limited, however, there is a method by which a poly imide orientation film orientated in a predetermined direction is formed by, for example, rubbing.

According to the structure of the present example, a liquid crystal is used instead of the non-conductive liquid, and even when the colored particle is not charged, the display element functions as the same display element as in the first example.

Also in the present example, by arranging the colored particles with different colors, the color display can be carried out.

Next, the third example will be described.

In the present example, a micro-capsule which is formed of a plastic material whose surface is colored, and in which a liquid crystal medium is filled, is used. Herein, a phenomenon in which a voltage applied onto the micro-capsule dispersed in a liquid crystal deforms the micro-capsule is utilized. This phenomenon generally exists in the nematic liquid crystal or the ferroelectric liquid crystal.

Figure 7:
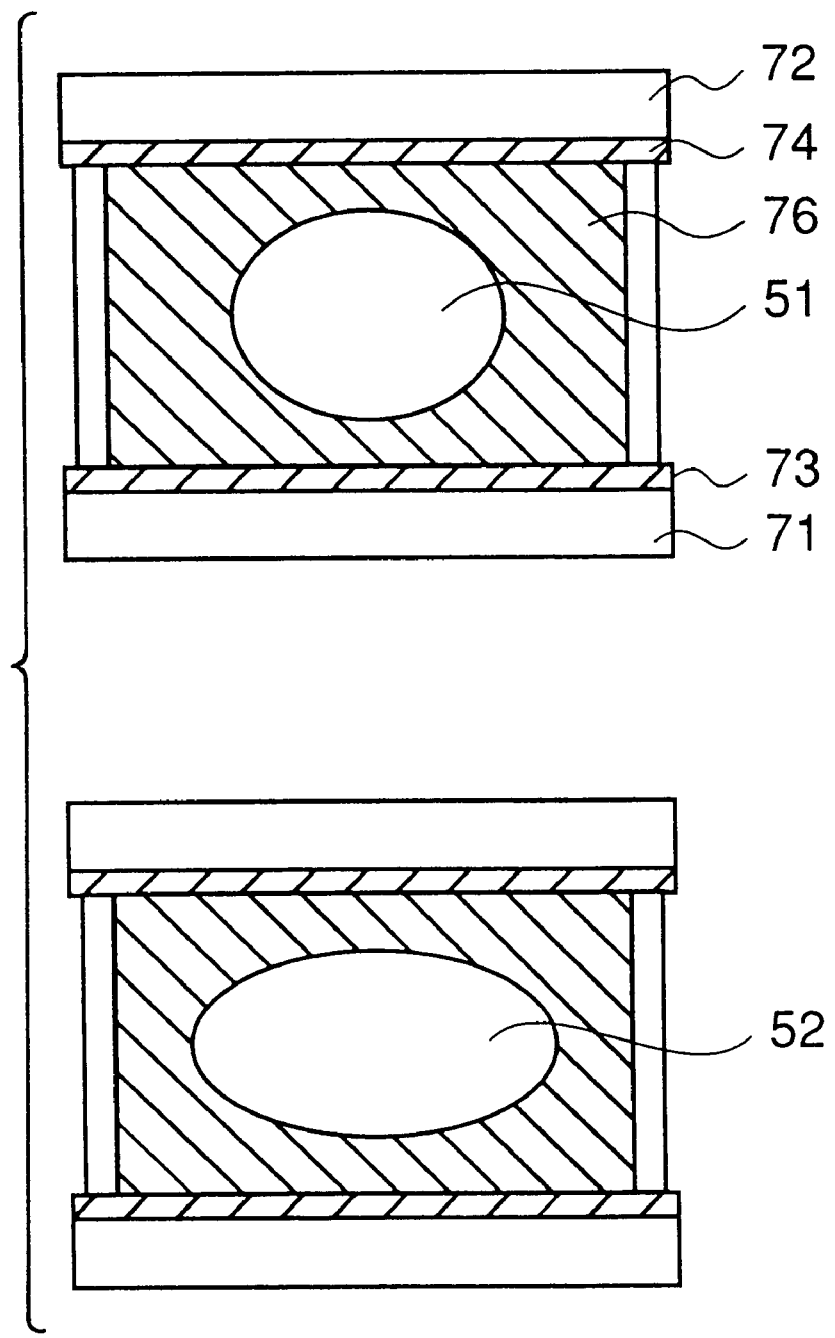
FIG. 7 is a view for explaining a micro capsule used in the third example of the present invention.

In FIG. 7A, a liquid crystal 76 is filled between an electrode 73 and an electrode 74. In this liquid crystal, a micro-capsule 51 is dispersed. The surface of the micro-capsule 51 is formed of a plastic material, and the liquid crystal medium is filled in the inside of the capsule.

Herein, when a voltage is applied across the electrode 73 and electrode 74, the shape of the spherical micro-capsule 51 is changed, and for example, as the micro-capsule 52 of FIG. 7B, the micro-capsule 51 is deformed to an elliptic shape. In this connection, the micro-capsule itself is not moved by the electric field.

Figure 8:
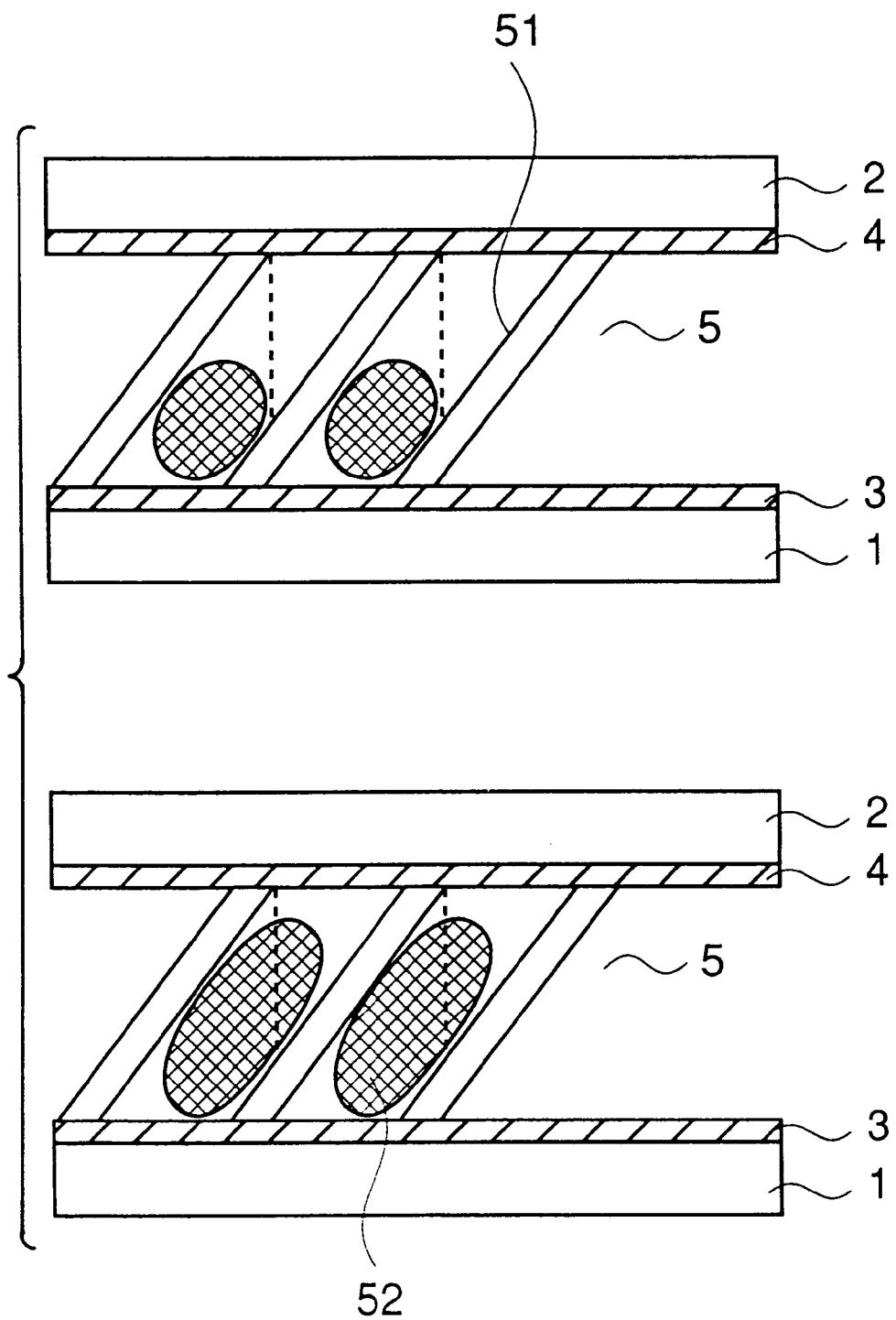
FIG. 8 is a view for explaining the third example of the present invention.

Also in the present example, as shown in FIG. 8, the same cell as in the first example is used. That is, a space is formed by the partition wall 5 slantingly provided between the electrode 3 on the substrate 1 and the electrode 4 on the substrate 2.

In this space, as shown in FIG. 8A, the liquid crystal and the micro-capsule 51 are filled.

As a liquid crystal is used instead of the non-conductive liquid, the P type or N type nematic liquid crystal, or ferroelectric liquid crystal can be used. Further, the liquid crystal filled in the micro-capsule 51 can be the same as liquid crystal in the cell.

As the plastic material of which the surface of the micro-capsule 51 is formed, butadiene, isoprene, or gum arabic can be used. The micro-capsule can be colored by using the pigment or dye in these materials as needed. The particle diameter of the micro-capsule 51 is appropriately selected depending on the distance between substrates or interval between the partition walls. Generally, when it is about 10 μm–100 μm, preferably, about 20 μm–50 μm, it can be regarded as a fine display element.

The micro-capsule 51 is, in no electric field condition, formed into a near spherical shape. The shape under no electric field condition also depends on the distance between the substrates and the interval between the partition walls.

In the no electric field condition, the size of the micro-capsule 51, the interval between the partitions and the slant of the partition wall are designed so that the microcapsule 51 is hidden by the shade of the slanting partition wall. Accordingly, in the no electric field condition, the micro-capsule 51 can not be observed from above, and the color of the partition wall is displayed.

When a voltage is applied onto the electrode 3 and the electrode 4, as shown in FIG. 8B, the micro-capsule 52 is deformed. Accordingly, a portion of the micro-capsule 52 appears from the shade of the partition, and the portion can be observed also from above. In this case, the color of the micro-capsule 52 is displayed.

In this manner, when a voltage is not applied onto the electrode 3 and electrode 4, the color of the partition wall is displayed, and when a voltage is applied, the color of the micro-capsule 52 is displayed, and thereby, a 2-color display can be carried out.

Herein, a case where the liquid crystal micro-capsule 52 is entered in the liquid crystal 76, is described; however, other than this, it is also possible that the liquid crystal micro-capsule 52 is entered in the non-conductive liquid. In this case, the liquid crystal in the liquid crystal micro-capsule 52 is deformed. Further, reversely, the nonconductive liquid is filled in the micro-capsule, and can also be entered in the liquid crystal. In this case, the liquid crystal outside the micro-capsule is deformed.

Also in the present example, in the same manner as in the first example, the color display can be carried out on the base of a 2-color display.

Figure 9:
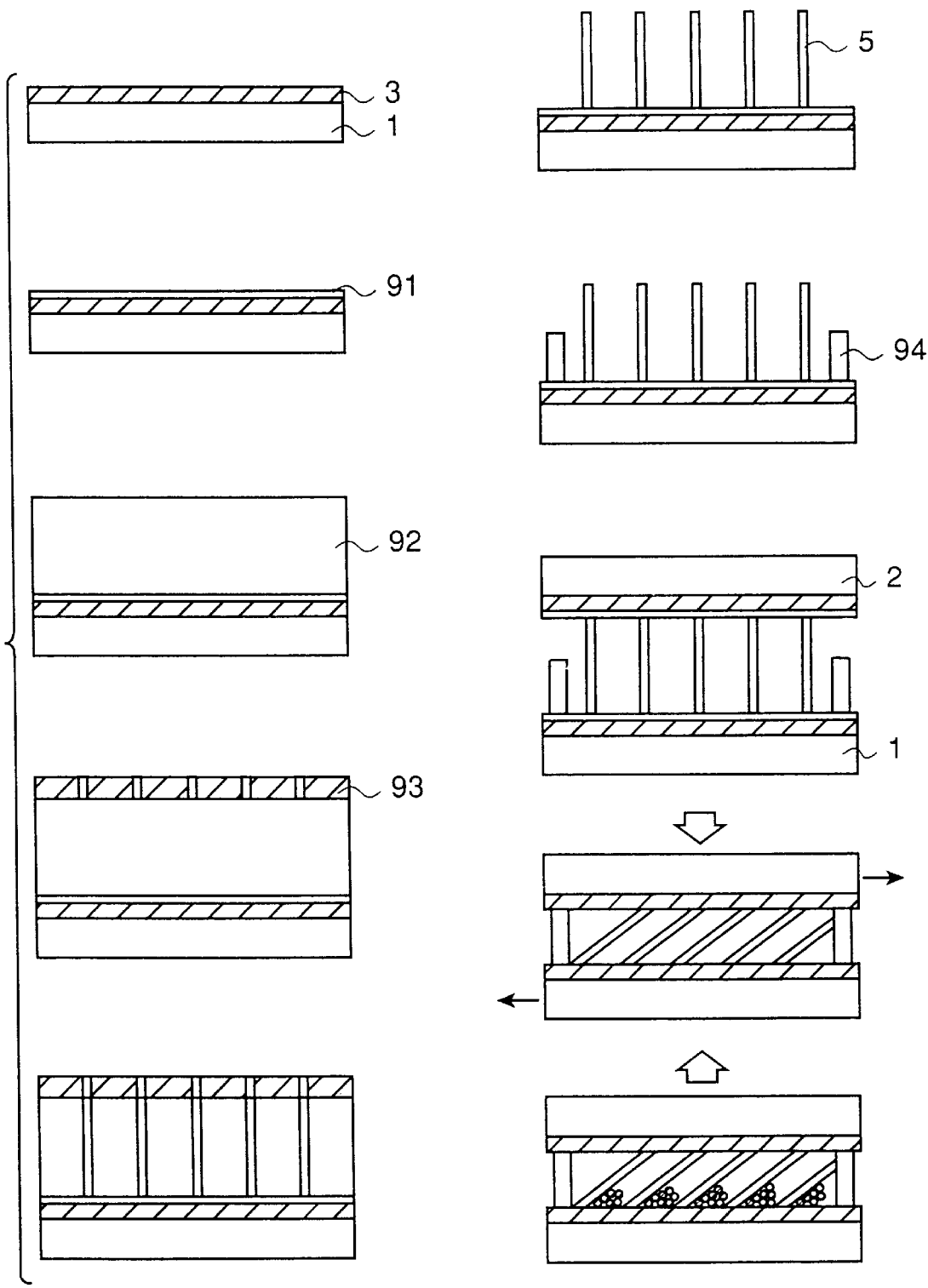
FIG. 9 is an illustration of various views for explaining a production method of the example of the present invention.

Next, referring to FIG. 9, an example of the production method of the display element in the above example, will be described.

Initially, as shown in FIG. 9A, the electrode 3 is formed on the substrate 1. The method to form the electrode 3 is different depending on the kind of electrodes utilized. Generally, an electrode layer is formed by coating or evaporation. When needed, the electrode layer is patterned and the electrode for each pixel can be formed, or a striped electrode can be formed.

An insulating resin layer 91 or conductive material layer (not shown) may be further provided on the electrode 3 surface. Specifically, in the case of the second example, in order to control the movement direction of the particles when the voltage is applied, it is preferable that the insulating resin layer 91 be provided and that the orientation of the insulating layer 9 is processed by rubbing (FIG. 9B).

Succeedingly, the photosensitive resin layer 92 is formed on the insulating resin layer 91 (FIG. 7C). As a photosensitive resin layer 92, a material, in which a photosensitive component is mixed in the resin material constituting the partition wall, is used. The photosensitive component is not specifically limited, and can be arbitrarily selected. Further, herein, a case where the insulating resin layer 91 is formed, is described; however, if the insulating resin layer 91 is not formed, then the photosensitive resin layer 92 can also be directly formed on the electrode 3.

As shown in FIG. 9D, a pattern mask 93 is provided on the photosensitive resin layer 92 formed as described above. After that, a linear translucent portion is provided on the pattern mask 93, and the photosensitive resin layer 92 is exposed. As shown in FIG. 9E, the photosensitive resin layer 72 of a portion which has received the light is hardened. Herein, an example, in which a portion which has received the light is hardened, is described; however, there is also a method that the pattern is reversed, and a portion which has not received the light is hardened. By using ordinary exposure method and developing method, the linear groove can be formed. In another approach, the exposure by scanning exposure without using the pattern mask can also be carried out.

In this connection and in the above example, it is necessary that the partition wall be light tight. Therefore, partition wall formation can include a pigment or dye in the photosensitive resin layer 92 constituting the partition wall. However, in this case, it is necessary that the amount of the pigment or dye in the photosensitive resin layer 92 be adjusted so that it does not interfere with the exposure process. Alternatively, the exposure can be conducted by a light of a wavelength in which the coloring of the photosensitive resin layer presents no problem.

It is also possible that, until the partition wall is formed, the photosensitive resin layer is transparent, and, after the partition wall is formed, the partition wall is colored.

After development, the partition wall 5 is formed on the substrate 1 (FIG. 9F).

On the end portion of the substrate 1, the side plate 94 as shown in FIG. 9G is provided. The side wall 94 can also be provided to function as a spacer. Further, a height of the side plate may be the same height as the partition wall 5 depending on the material. When the side plate 94 functions as the spacer, the side plate material is a non-compression material, and the height of the side plate is a height corresponding to a final distance between substrates.

After that, the second substrate 2 opposite to the substrate 1 is adhered to the partition wall 5 (FIG. 9H).

Further, as shown in FIG. 9I, while the substrate 1 and the substrate 2, which are opposite to each other, are being shifted in a perpendicular direction to the partition wall 5, the partition wall 5 is compressed up and down. Thereby, the partition wall 5 can be provided slantingly to the substrate surface. The cell is formed by the slanting partition wall 5, the substrate 1, and the substrate 2.

The side plate 94 is previously made to be lower than the partition wall 5, and when the partition wall 5 are finally slanted, the substrate 1 and the substrate 2 are adhered to each other. Other than this method, it is also possible that a compressible material is used for the side plate 94, and when the partition wall 5 is being slanted, the side plate 94 is compressed.

In the cell formed in the manner as described above, the non-conductive liquid in which the colored particles are dispersed is filled from an end portion of the partition wall 5 (FIG. 9J). There are various methods for filling the non-conductive liquid. For example, an inside of the gap between substrates 1 and 2 is evacuated, and the non-conductive liquid is penetrated, or the non-conductive liquid in which the different colored particles are dispersed can also be filled in for each gap.

Opened portions of the gaps are sealed, and the display element of the present invention is completed.

In this connection, the above production method is an example. Other than this, for example, it is also possible that the photosensitive resin layer 92 of FIG. 9C is obliquely exposed, and the structure corresponding to FIG. 9I is directly formed.

EXAMPLE 1

A transparent electrode is provided on a glass substrate. For this transparent electrode, Indium Tin Oxide (ITO) of about 0.05 $\mu$m thickness can be used. On this substrate, methyl methacrylate whose softening temperature is more than about 120° C., is coated by spin coating, and the non-conductive resin layer of about 0.5 $\mu$m is formed.

Next, photosensitive polyimide in which titanium oxide particles are dispersed, is coated, and the photosensitive resin layer is formed.

After that, the exposure and wet development are conducted, and thereby, a white partition wall whose height is about 50 $\mu$m, and width is about 10 $\mu$m, is formed.

Further, a seal agent to which a silica spacer is added is coated on an end portion of the substrate.

Onto this substrate, an opposed substrate on which methyl methacrylate is coated is adhered. Also, on the opposed substrate, an electrode is formed.

After that, by using a combination device, the opposite substrate is slid while being maintained at 150° C., and the skeletal structure as in the example is made. Herein, the distance between substrates is adjusted so that it is about 20 $\mu$m.

On the one hand, silicone oil in which mixed particles (the particle diameter is about 0.5 $\mu$m–about 2 $\mu$m) of polystyrene and carbon are dispersed, is previously prepared. Colored particles and the non-conductive liquid are filled in the formed gap, and the display element of the present invention is produced.

The display element is observed by the optical microscope. It is found that there is no flocculation of the colored particles, and a uniform layer structure is formed along the partition wall. The display characteristic is such that drive voltage of about ±15 V yields a response speed of about 10 $\mu$s and a contrast ratio of about 1:5. A good display element is formed.

COMPARATIVE EXAMPLE 1

In Comparative Example 1, the display element in which a process to slide the opposite substrates toward each other is neglected is produced. In this connection, the cell gap is 80 $\mu$m. When the display characteristic is estimated in the same manner as in example 1, a drive voltage of ±50 V yields a response speed of 30 $\mu$s, and a contrast ratio is 1:5. The drive voltage and response speed are inferior to the display element in example 1.

EXAMPLE 2

In the same manner as in example 1, the cell is formed between substrates. Liquid crystal micro-capsules filled in the gap between substrates is adjusted as follows. MJ98522 made by Mark Japan Co., of about 85 wt %, did-isobutyl fumarate monomer of about 6 wt %, and KAYARAD TEMPTA made by Nippon Kayaku Co. of about 1 wt %, and benzoyl peroxide of about 0.2 wt % are mixed and dissolved. Herein, MJ98522 made by Merk Japan Co., is a nematic liquid crystal having the positive dielectric anisotropy. KAYARAD TEMPTA made by Nippon Kayaku Co. is a crosslinking agent. Benzoyl peroxide is an initiator. Coloring matters G-176, D-80, and AQ-B1 made by Mitsubishi Kagaku Co. are mixed, and a black coloring matter is adjusted. Pure water in which this black coloring matter of about 5 wt %, methacrylate monomer of about 4 wt %, and interfacial active agent of sodium dodecil sulfonate of about 1 wt % are added, and the mixed liquid of previously mixed and dissolved liquid crystal are mixed. After that, it is emulsified by using the film emulsification apparatus (Ise Kagaku Kogyo Co.) using porous glass whose hole diameter is about 4.4 $\mu$m. It is agitated at about 500 rpm, and polymerized at about 110° C. for about 6 hours under a nitrogen atmosphere. The obtained generated matter is filtered by a filter of about 1 $\mu$m, and the residue is washed by pure water three times. Thereby, the liquid crystal micro-capsule is covered by black colored high polymer film of about 60 $\mu$m particle diameter.

The dispersion liquid in which the micro-capsule of about 10 wt % is dispersed in MJ98522 made by Merc Japan Co. is made. This dispersion liquid is filled in the cell in the same manner as in example 1, and thus the display element is produced.

When the display element is observed by the optical microscope, it is found that there is no flocculation of the particles, and a uniform structure along the partition wall is formed. As the display characteristic, a drive voltage of about ±25 V yields a response speed of about 20 $\mu$s and a contrast ratio of about 1:5. The display element exhibits excellent performance.

As detailed above, according to the examples of the present invention, the display element in which the structure is a thin type, the drive voltage is low, the response speed is high, and the display quality is high, and its production method are provided Numerous modifications and variations of the present invention are possible in light of the above teachings. It is therefore to be understood that within the scope of the appended claims, the invention may be practiced otherwise than as specifically described herein.

What is claimed as new and desired to be secured by letters patent of United States is:

1. A reflective display comprising:
   a transparent first substrate;
   a transparent first electrode formed on said first substrate;
   a second substrate located opposite to said first substrate;
   a second electrode formed on said second substrate;
   partition walls dividing the display into plural cells surrounded by the partition walls, said first substrate, and said second substrate, said cells configured to be provided with an electrical bias from said first electrode and said second electrode, said partition walls slanted with respect to the first substrate and the second substrate; and at least one colored particle located in at least one cell of said cells and configured to move within the at least one cell, wherein a side of a part of said partition wall is observed through said first substrate under a first bias condition and the side is obscured by the at least one colored particle under a second bias condition.

2. A display according to claim 1, wherein a plurality of said cells comprises a pixel.

3. A display according to claim 1, wherein said partition walls are white.

4. A display according to claim 1, wherein said second substrate and said second electrode are transparent.

5. A display according to claim 1, wherein said first electrode is a common electrode and said second electrode is a pixel electrode.

6. A display according to claim 1, wherein said first electrode and said second electrode have a striped shape, and said first electrode and said second electrode are oriented perpendicular to each other.

7. A display according to claim 1, wherein a plurality of said at least one colored particle is dispersed in a non-conductive liquid filing said cells, and a plurality of said at least one colored particle is charged.

8. A display according to claim 7, wherein said non-conductive liquid filing said cells has a color different from a color of said at least one colored particle.

9. A display according to claim 8, wherein said non-conductive liquid filing said cells has a color similar to said partition wall.

10. A display according to claim 1, wherein a plurality of said at least one colored particle is dispersed in a liquid crystal filling said cells.

11. A display according to claim 7, wherein said at least one colored particle in one of said cells has a color different from a color of said at least one colored particle in another of said cells.

12. A display according to claim 11, wherein a first group of said cells encloses at least one red colored particle, a second group of said cells encloses at least one green colored particle, and a third group of said cells encloses at least one blue colored particle.

13. A display according to claim 12, wherein a fourth group of said cells encloses at least one black colored particle.

14. A display according to claim 7, wherein one of said partition walls has a color different from another partition wall.

15. A display according to claim 1, wherein said at least one colored particle comprises:

a polymer capsule encapsulating a liquid crystal medium and capable of being transformed in shape by an application of an electric field.

16. A display according to claim 15, wherein said capsule has a color different from a color of said partition wall.

17. A display according to claim 15, wherein said liquid crystal has a color different from a color of said partition wall.

18. A display according to claim 15, wherein said cells include said at least one colored particle and a non-conductive liquid.

19. A display according to claim 18, wherein said non-conductive liquid is a liquid crystal.

20. A display according to claim 1, wherein said at least one colored particle comprises a polymer capsule encapsulating a non-conductive liquid, and said cells include said at least one colored particle comprising a polymer capsule and are filled with a liquid crystal.

21. A method for manufacturing a reflective display including a transparent first substrate, a transparent first electrode formed on said first substrate, a second substrate located opposite to said first substrate, a second electrode formed on said second substrate, partition walls dividing the display into cells, each cell of said cells surrounded by the partition walls, said first substrate, and said second substrate, and said partition walls slanted with respect to the first substrate and the second substrate, the method comprising the steps of:

forming the partition walls on the first substrate;

contacting the second substrate on said partition walls;

shifting said first substrate and said second substrate to provide said partition walls slanted with respect to the first substrate and the second substrate;

sealing said first substrate and said second substrate; and injecting colored particles and a non-conductive liquid between said partition walls, said first substrate, and said second substrate.

22. The method according to claim 21, wherein the step of forming partition walls on a first substrate comprises:

forming white partition walls.

23. The method according to claim 21, wherein the step of injecting comprises:

injecting at least one charged colored particle.

24. The method according to claim 21, wherein the step of injecting comprises:

injecting a non-conductive liquid which has a color different from a color of the colored particles.

25. The method according to claim 21, wherein the step of injecting comprises:

injecting a non-conductive liquid which has a color similar to the partition walls.

26. The method according to claim 21, wherein the step of injecting comprises:

injecting colored particles into one cell of said cells which have a color different from a color of colored particles in another cell.

27. The method according to claim 26, wherein the step of injecting comprises:

injecting into a first group of said cells at least one red colored particle;

injecting into a second group of said cells at least one green colored particle; and injecting into a third group of said cells at least one blue colored particle.

28. The method according to claim 27, wherein the step of injecting comprises:

injecting into a fourth group of said cells at least one black colored particle.

29. The method according to claim 21, wherein the step of forming comprises:

forming partition walls with one of said partition walls having a color different from a color of other partition walls.

30. The method according to claim 21, wherein the step of injecting comprises:

injecting a polymer capsule, said polymer capsule encapsulating a liquid crystal medium and transformed in shape by an application of an electric field.

31. The method according to claim 30, wherein the step of injecting a polymer capsule comprises:

injecting a polymer capsule which has a color different from a color of said partition wall.

32. The method according to claim 30, wherein the step of injecting comprises:

injecting a liquid crystal which has a color different from a color of the partition walls.

33. The method according to claim 21, wherein the step of injecting comprises:

injecting a liquid crystal as the non-conducting liquid.

* * * * *